United States Patent [19]

Gottzein et al.

[11] 4,198,910
[45] Apr. 22, 1980

[54] MAGNET SUSPENSION RAILWAY VEHICLE

[75] Inventors: Eveline Gottzein, Oberpframmern; Friedrich Ossenberg-Franzes, Brunnthal; Christian Roche, München, all of Fed. Rep. of Germany

[73] Assignee: Messerschmitt-Bölkow-Blohm GmbH, München, Fed. Rep. of Germany

[21] Appl. No.: 802,876

[22] Filed: Jun. 2, 1977

[30] Foreign Application Priority Data

Jun. 12, 1976 [DE] Fed. Rep. of Germany ....... 2626440

[51] Int. Cl.² ................... B60G 25/00; B61B 13/08; B61D 3/00; B61D 11/00
[52] U.S. Cl. .................................. 104/281; 105/77; 105/144; 105/157 R
[58] Field of Search ....... 104/148 R, 148 M, 148 MS, 104/148 SS; 105/77, 157 R, 144

[56] References Cited

U.S. PATENT DOCUMENTS

| 2,895,429 | 7/1959 | Baermann | 105/77 |
| 3,548,751 | 12/1970 | Izhelya | 105/77 X |
| 4,029,020 | 6/1977 | Nakamura et al. | 104/148 MS |

FOREIGN PATENT DOCUMENTS

| 2342734 | 4/1975 | Fed. Rep. of Germany | 104/148 M |
| 2127047 | 7/1975 | Fed. Rep. of Germany | 104/148 M |
| 2511382 | 9/1976 | Fed. Rep. of Germany | 104/148 M |

Primary Examiner—Joseph F. Peters, Jr.
Assistant Examiner—Howard Beltran
Attorney, Agent, or Firm—Toren, McGeady and Stanger

[57] ABSTRACT

A magnetic suspension vehicle carries serially arranged magnet structures which are serially coupled to each other and resiliently mounted for adaptation to an associated rail arrangement.

9 Claims, 4 Drawing Figures

Fig.1
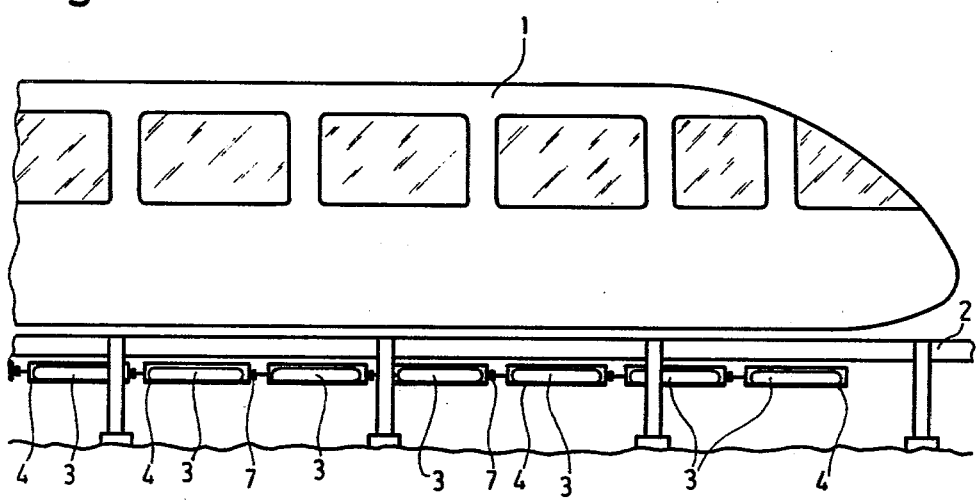
Fig.1a
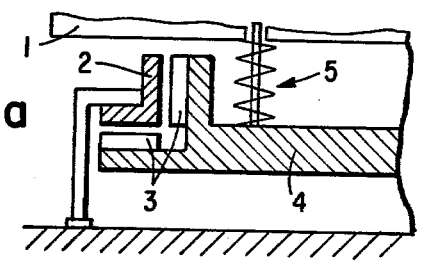
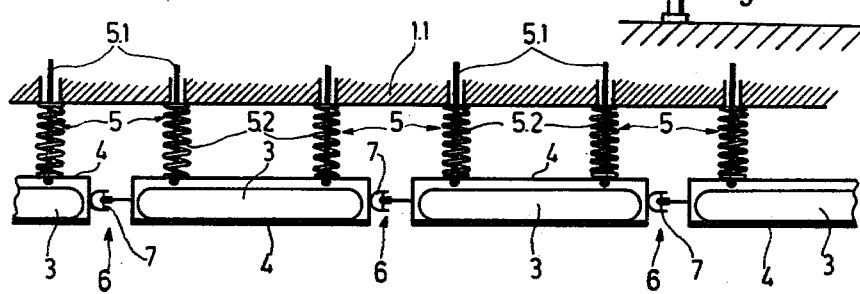
Fig.2
Fig.2a
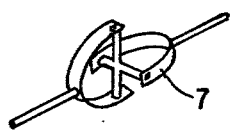

MAGNET SUSPENSION RAILWAY VEHICLE

BACKGROUND OF THE INVENTION

This invention relates to magnetic suspension vehicles, and particularly to magnetic suspension vehicles with magnets that cooperate with stationary rail arrangements.

A magnetic suspension vehicle may be supported and driven in free suspension by magnetic attraction forces. It is known that there must exist, between the vehicle's magnets and an associated stationary rail arrangement, a suspension freedom and a clearance whose value is extremely small, such as from ten to fifteen millimeters. This is especially true in view of the electrical energy needed to support and drive such a vehicle.

The maintenance of the suspension freedom within any prescribed travel comfort criteria has two aspects. Partly it is a regulation-technique problem, which to this time could at least in principal be considered as solved. Secondly, it is a structural problem which at least partly concerns the structure and arrangement of the magnets. In this regard, practical solutions have been proposed for vibrationally decoupling the magnetic suspension vehicle from its magnets by elastically arranging the latter. For example, such decoupling was to be done by means of so-called (active or also passive) secondary spring devices between a magnetic frame and an overlying vehicle body. In this connection, in accordance with a further important contribution, the travel of a magnetic suspension vehicle about a curve could be improved by a proposed arrangement in which the magnets are members of a so-called magnet chain. The magnet chain is composed of several individual magnets arranged serially in the vehicle's longitudinal direction. The individual magnets are connected with the magnetic suspension vehicle by spring means operating parallel to their respective magnetic forces. This arrangement naturally makes it easier to maintain a prescribed suspension freedom and a correspondingly desired clearance between the magnets with the rail arrangement. This is so because of the relatively large number of individually flexibly movable magnets of relatively short length when compared to the longitudinal magnets hitherto used in known magnetic suspension vehicles.

In addition to this, the nominal flux strength of the individual magnets necessarily become smaller. Also, with equal power rise rate, the regulating range of the current or flux strengths, i.e., the so-called magnetic force magnification is also reduced. As a result, more suitable magnets can be constructed for a particular power or capacity and weight. In all cases, with the proposed arrangements, calculations must be made for irregular clearance differences relative to the rail arrangement along the magnetic chain at the interfaces between the adjacent individual magnets. Such distance differences can, under certain circumstances, lead to undesired feedback on the dynamic behavior of the magnetic suspension vehicle, and therefore, result in impairment of travel comfort.

An object of the invention is to improve magnetic suspension vehicles.

Another object of the invention is to avoid the aforementioned shortcomings.

SUMMARY OF THE INVENTION

According to a feature of the invention, these objects are attained, by serially arranging magnets which are springily movable relative to an associated stationary rail arrangement, and serially arranging the individual springily movable magnets, or forming them in an accompanying serially arranged individual springily movable carriers or supports or frames, and coupling them to each other along the row at least in the sense of producing a reciprocal adaptation of the magnets and the carrier movement relative to the rail arrangement.

According to another feature of the invention the spring mounts of the magnets or the carriers (magnet frames for individual magnets or magnet rows) are functionally interdependent, but in all cases, only to such an extent that transverse and longitudinal movement of adjacent magnets or carriers relative to each other are substantially eliminated.

In accordance with another feature of the invention, an angularly movable coupling is inserted between the respective adjacent magnets or carriers in such a manner that the coupling can execute at least an angular deviation in its central longitudinal plane.

According to another feature of the invention, the coupling is capable of turning relative to adjacent magnets or carriers so that its angular deviation occurs about its longitudinal axis. This occurs particularly for the case when the magnets on both longitudinal sides of the vehicle are mounted in the same carriers or support.

The aforementioned means not only result in an advantageous decrease of the tolerances in the clearance between the magnets to the rail arrangements, and therefore to an improvement in the dynamic behavior of the magnetic suspension vehicle as well as a diminution of the magnet weights and power demands, but also results in an increased stability and reliability of the suspension system. Upon failure of one spring suspension (of a magnet or a carrier) its function is automatically performed by the adjacent spring suspensions in the overall system. By virtue of the invention, sudden differences in distance between the magnets and the rail arrangements at contact points between the magnets and magnet rows are substantially eliminated.

These and other features of the invention are pointed out in the claims. Other objects and advantages of the invention will become evident from the following detailed description when read in light of the accompanying drawings.

BRIEF DESCRIPTION OF THE DRAWINGS

In the drawings:

FIG. 1 illustrates an elevational section of a magnetic suspension vehicle coupled to a rail arrangement and embodying features of the invention.

FIG. 1a is a partial section 1a—1a of FIG. 1.

FIG. 2 is an elevational view only of the floor of the magnetic suspension vehicle according to FIG. 1 with magnets and an associated carrier arrangement on a larger scale, shown in section.

FIG. 2a is a perspective view of a coupling in FIG. 2.

DETAILED DESCRIPTION OF PREFERRED EMBODIMENTS

In FIGS. 1 and 1a, a magnetic suspension vehicle is held and guided in free suspension by use of the magnetic attraction forces between upraised ferromagnetic rails 2 and magnets 3. Only the support magnets are illustrated. However, FIGS. 1a, 2 and 2a make it evident that each of the magnets 3 is arranged in a carrier or support 4 (a so-called magnet frame) which is elastically arranged from the floor or underside 1.1 of the magnetic suspension vehicle 1. Respective spring suspensions 5 which furnish the elastic arrangement are constructed to be rigid transverse to their longitudinal axes. According to one embodiment of the invention, this rigidity is achieved by bolts 5.1 which are linked to the carriers 4 and axially shiftable in the floor 1.1. A helical spring 5.2 secured to the respective carriers 4 on the one hand and to the floor 1.1 on the other hand, furnish the axial elasticity of the spring suspensions 5.

It should, of course, be recognized that the spring suspension 5 for elastic arrangement of the carriers is not dependent upon the use of helical springs. According to other embodiments of the invention, the elastic spring elements are formed of natural or synthetic rubber or similar plastic compounds which are soft essentially only in the axial direction. In that sense, the bolts 5.1 and the helical springs 5.2 may be considered as merely symbolic.

It is desirable to eliminate transverse movement of adjacent magnets 3 relative to each other at all times. The magnets 3 might otherwise shift to undesired interval differences relative to the rails 2 at the contact positions 6. It is also desirable, upon failure of one suspension spring 5 to be able to transfer its function to a neighboring suspension. For these purposes, the carriers 4 are coupled to each other for further adjustment of their movement relative to the rails 2, in the sense of an opposing adaptation. See FIG. 1. Thus, at all times there is provided an angularly movable coupling 7 between two carriers. The couplings permit angular deviations of the carriers, and hence also the magnets relative to each other in their horizontal and vertical elongated mid-planes. According to one embodiment of the invention, a cross coupling performs this function. According to another embodiment of the invention, this is performed by a universal joint. Such couplings and joints are only examples. Other types of couplings and joints may be used. For example, correspondingly operating elastic members may be utilized.

Insofar that aside from the illustrated magnets 3, other magnets on the illustrated carriers 4 mounted upon the opposite lying vehicle side, suitable means, evident to those skilled in the art, permit turning of the continuously adjacent carriers relative to each other. In this regard, and in accordance with one embodiment of the invention, the carriers or frames 4 are connected by means of a ball joint coupling. According to another embodiment of the invention, for use in the case of the illustrated universal coupling 7, one coupling half is arranged to be rotatably movable on the corresponding carrier. That is to say, that the coupling half is arranged to be rotatably movable about the carrier axis. Finally, according to another embodiment of the invention, supplementary spring elements are inserted between the carriers 4 These spring elements operate as restoring mechanisms during angular deviations.

The aforementioned means are not limited to coupling the carriers. According to an embodiment of the invention, the carriers are eliminated and the direct elastically arranged magnets are coupled to each other. According to another embodiment of the invention, the carriers 4 are constructed with a longer mechanical length and each carrier is provided with a row of magnets. In this manner, the magnets of each carrier are individually elastically arranged. According to another embodiment of the invention, the multiplicity of magnets in each carrier are further elastically arranged in the same manner as the carriers and coupled to each other.

It should be noted that the illustrated arrangements show only relatively wide longitudinal gaps between the carriers 4, or the magnets 3, in order to illustrate the couplings 7.

While embodiments of the invention have been described in detail, it will be evident to those skilled in the art that the invention may be embodied otherwise without departing from its spirit and scope.

What is claimed is:

1. A magnetic suspension vehicle for movement relative to a rail arrangement, comprising a vehicle body, a plurality of magnet means elastically mounted on the body for assuming positions spaced from the rail arrangement by given finite distances when energized, said magnet means being serially arranged in a row along the body, said magnet means being individually flexibly mounted on the body, universal coupling means connecting said magnet means to each other along the row to reciprocally adjust the movement of the magnet means relative to the rail arrangement so that when force variations cause one end of one magnet means to deviate from the given finite distances between the magnet means and the rail arrangement by approaching the rail arrangement too closely and conversely by departing too far therefrom, the one end of one magnet tends to draw an adjacent end of the serially adjacent magnet in the same direction and is drawn by the end of the serially adjacent magnet in the other direction.

2. A magnetic suspension vehicle as in claim 1, wherein adjacent ones of said magnet means form couplings which join the adjacent ones of said magnet means to each other, said coupling means permit articulating movement of the magnet means relative to each other.

3. A magnetic suspension vehicle as in claim 1, wherein spring arrangements mount the magnet means on the body for limiting longitudinal movement of adjacent magnet means relative to each other.

4. A vehicle as in claim 1, wherein said coupling means permit at least angular relative movement of the magnet means along the longitudinal mid-planes of the respective magnet means.

5. A vehicle as in claim 4, wherein said coupling means permits articulating movement of the magnet means relative to each other.

6. A vehicle as in claim 1, wherein each of said magnet means includes a magnet assembly and elastic mounting means connecting the magnet assembly to the body for springily mounting the magnet assembly from the body.

7. A vehicle as in claim 6, wherein said elastic mounting means includes a rod secured to the magnet assembly and slidably movable perpendicular to the vehicle body and a spring surrounding the rod between the body and the magnet assembly.

8. A vehicle as in claim 1, wherein each of said magnet means includes a magnet carrier, at least one magnet supported by the carrier, and elastic mounting means connecting the carrier to the body for springily mounting the carrier from the body.

9. A vehicle as in claim 8, wherein said elastic mounting means includes a rod secured to the carrier and slidably movable perpendicular to the body and a spring surrounding the rod between the body and the carrier.

* * * * *